(12) United States Patent
Ikoma et al.

(10) Patent No.: US 11,742,514 B2
(45) Date of Patent: Aug. 29, 2023

(54) POROUS FILM, SEPARATOR FOR SECONDARY BATTERIES, AND SECONDARY BATTERY

(71) Applicant: Toray Industries, Inc., Tokyo (JP)

(72) Inventors: Kei Ikoma, Nasushiobara (JP); Nobuyasu Kai, Otsu (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 159 days.

(21) Appl. No.: 16/650,548

(22) PCT Filed: Sep. 26, 2018

(86) PCT No.: PCT/JP2018/035816
§ 371 (c)(1),
(2) Date: Mar. 25, 2020

(87) PCT Pub. No.: WO2019/065787
PCT Pub. Date: Apr. 4, 2019

(65) Prior Publication Data
US 2020/0321586 A1 Oct. 8, 2020

(30) Foreign Application Priority Data

Sep. 29, 2017 (JP) ................................. 2017-189896

(51) Int. Cl.
*H01M 50/449* (2021.01)
*H01M 10/0525* (2010.01)
(Continued)

(52) U.S. Cl.
CPC ..... *H01M 10/0525* (2013.01); *H01M 50/417* (2021.01); *H01M 50/423* (2021.01);
(Continued)

(58) Field of Classification Search
CPC .......... H01M 10/0525; H01M 50/463; H01M 50/446; H01M 50/411
See application file for complete search history.

(56) References Cited

U.S. PATENT DOCUMENTS 10,343,382 B2 7/2019 Sugata et al.
2010/0255374 A1 10/2010 Nemoto et al.
(Continued)

FOREIGN PATENT DOCUMENTS

CN 102341159 2/2012
CN 102468466 5/2012
(Continued)

OTHER PUBLICATIONS

Sawamoto et al., JP2015057460 (A), English Machine Translation, pp. 1-26. (Year: 2015).*
(Continued)

*Primary Examiner* — Tae-Sik Kang
(74) *Attorney, Agent, or Firm* — DLA Piper LLP (US)

(57) ABSTRACT

A porous film includes a porous substrate, and a porous layer laminated on at least one surface of the porous substrate. The porous layer contains an organic resin different from a resin constituting the porous substrate. A height of a projection of the porous layer in an interface between the porous substrate and the porous layer is 200 nm or more, and a distance between projections is 1 μm or more.

8 Claims, 1 Drawing Sheet

(51) Int. Cl.
*H01M 50/446* (2021.01)
*H01M 50/463* (2021.01)
*H01M 50/417* (2021.01)
*H01M 50/423* (2021.01)
*H01M 50/489* (2021.01)
*H01M 50/443* (2021.01)
*H01M 50/457* (2021.01)
*H01M 50/451* (2021.01)
*H01M 50/491* (2021.01)

(52) U.S. Cl.
CPC ....... *H01M 50/443* (2021.01); *H01M 50/446* (2021.01); *H01M 50/451* (2021.01); *H01M 50/457* (2021.01); *H01M 50/463* (2021.01); *H01M 50/489* (2021.01); *H01M 50/491* (2021.01)

(56) References Cited

U.S. PATENT DOCUMENTS

| | | | |
|---|---|---|---|
| 2012/0028101 | A1 | 2/2012 | Ishihara et al. |
| 2012/0202102 | A1 | 8/2012 | Kakibe et al. |
| 2014/0178741 | A1 | 6/2014 | Hasegawa et al. |
| 2014/0315065 | A1 | 10/2014 | Mizuno et al. |
| 2014/0349169 | A1 | 11/2014 | Mizuno et al. |
| 2015/0056490 | A1 | 2/2015 | Shimizu et al. |
| 2016/0013461 | A1 | 1/2016 | Mizuno et al. |
| 2016/0240830 | A1* | 8/2016 | Mizuno ............... B32B 27/205 |
| 2016/0276642 | A1 | 9/2016 | Mizuno et al. |
| 2017/0005321 | A1 | 1/2017 | Sugata et al. |
| 2017/0279102 | A1 | 9/2017 | Hasegawa et al. |
| 2017/0282513 | A1 | 10/2017 | Sugata et al. |
| 2018/0083249 | A1 | 3/2018 | Hasegawa et al. |
| 2020/0358066 | A1 | 11/2020 | Kai et al. |

FOREIGN PATENT DOCUMENTS

| | | |
|---|---|---|
| CN | 104185551 | 12/2014 |
| CN | 104823304 | 8/2015 |
| CN | 105142904 | 12/2015 |
| CN | 105246692 | 1/2016 |
| CN | 105745071 | 7/2016 |
| CN | 111433940 A | 7/2020 |
| EP | 3141385 A1 | 3/2017 |
| JP | 2016-107642 A | 6/1916 |
| JP | 2016-172572 A | 9/1916 |
| JP | 2007-125821 | 5/2007 |
| JP | 4560852 B2 | 8/2010 |
| JP | 5183435 B2 | 1/2013 |
| JP | 2013-046998 A | 3/2013 |
| JP | 2014-160565 A | 9/2014 |
| JP | 2015057460 A * | 3/2015 |
| JP | 2015-228358 A | 12/2015 |
| JP | 2013-130027 A | 7/2016 |
| TW | 200933955 | 8/2009 |
| WO | 2014/132791 A1 | 9/2014 |
| WO | 2015/050076 A1 | 4/2015 |
| WO | 2015/170653 A1 | 11/2015 |
| WO | 2017/051514 A1 | 3/2017 |

OTHER PUBLICATIONS

Extended European Search Report dated May 10, 2021, of counterpart European Application No. 18860120.7.
Office Action dated Jan. 21, 2022, of counterpart Chinese Application No. 201880058739.4, along with an English translation.
Office Action dated Jan. 22, 2022, of counterpart Taiwanese Application No. 107134014, along with an English translation.
Examination Report under Sections 12 & 13 of the Patents Act, 1970, and the Patents Rules, 2003, dated Feb. 25, 2022, of counterpart Indian Patent Application No. 202047012778.
Notification of Second Office Action dated Sep. 5, 2022, of counterpart Chinese Patent Application No. 201880058739.4, along with an English translation.
Notice of Reasons for Refusal dated Sep. 27, 2022, of counterpart Japanese Patent Application No. 2018-552275, along with an English translation.
Notification of Third Office Action dated Nov. 16, 2022, of counterpart Chinese Patent Application No. 201880058739.4, along with an English translation.
Request for the Submission of an Opinion dated May 10, 2023, of counterpart Korean Patent Application No. 10-2020-7003382, along with an English translation.

* cited by examiner

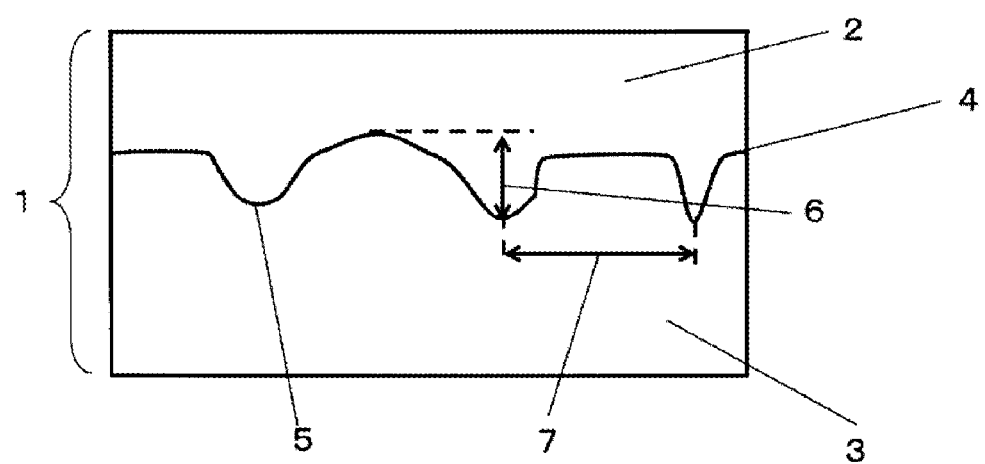

POROUS FILM, SEPARATOR FOR SECONDARY BATTERIES, AND SECONDARY BATTERY

TECHNICAL FIELD

This disclosure relates to a porous film, a secondary battery separator, and a secondary battery.

BACKGROUND

A secondary battery such as a lithium ion battery has been widely used for portable digital equipment such as a smart phone, a tablet, a mobile phone, a notebook computer, a digital camera, a digital video camera, and a handheld game console, portable equipment such as an electric tool, an electric motorcycle, and an electric assist bicycle, and an automobile such as an electric automobile, a hybrid vehicle, and a plug-in hybrid vehicle.

In general, the lithium ion battery has a structure in which a secondary battery separator and electrolytes are interposed between a positive electrode in which a positive electrode active material is laminated on a positive electrode current collector, and a negative electrode in which a negative electrode active material is laminated on a negative electrode current collector.

As the secondary battery separator, a polyolefin-based porous substrate is used. Examples of characteristics required for the secondary battery separator include: a characteristic that the secondary battery separator contains an electrolytic solution in a porous structure and enables movement of ions, and a shutdown characteristic that when a lithium ion battery generates heat abnormally, the porous structure is closed due to melting by the heat and the movement of ions is stopped, causing power generation to stop.

However, a shutdown characteristic at a further low temperature is required along with higher capacity and higher output of the lithium ion battery in recent years. The secondary battery separator is required to have not only the above characteristic but also a large temperature difference between the shutdown temperature and the temperature at which the separator melts, and dimensional stability and heat rupture resistance at high temperature. When the battery is further heated after the above shutdown characteristic is activated when the lithium ion battery generates heat abnormally, a short-circuit portion may be generated due to contraction of the secondary battery separator. In addition, when shock is applied to the lithium ion battery, the secondary battery separator generates heat under pressure locally applied, and thus film rupture of the secondary battery separator may occur. When such film rupture of the secondary battery separator occurs, short circuit may occur inside the battery. As a result, the secondary battery separator is required to have heat rupture resistance at high temperature in addition to the shutdown characteristic.

On the other hand, the lithium ion battery is also required to have excellent battery characteristics such as high output, long life, and high capacity so that the lithium ion battery is required to exhibit good battery characteristics without deteriorating battery characteristics when a shutdown characteristic at low temperature, a large temperature difference between the shutdown temperature and the temperature at which the separator melts, and dimensional stability and heat rupture resistance at high temperature are imparted to the secondary battery separator.

For these requests, Japanese Patent No. 5183435 has proposed a secondary battery separator whose heat shrinkage ratio can be reduced by laminating a porous layer containing inorganic particles on a porous film mainly containing polyolefin. In addition, JP 2016-130027 A has proposed a secondary battery separator with high heat resistance and high short-circuit temperature by laminating a porous layer made of a heat-resistant nitrogen-containing aromatic polymer and ceramic powders on a porous substrate However, in JP '435, adhesiveness between the porous layer containing inorganic particles and the porous film mainly containing polyolefin is not sufficient so that the heat shrinkage ratio increases when the temperature reaches a high temperature range after shutdown although the heat shrinkage ratio up to the shutdown temperature decreases due to the inorganic particles. Thus, sufficient dimensional stability and heat rupture resistance at high temperature cannot be ensured, and the shutdown characteristic depends on the characteristic of the porous film. In addition, in JP '027, the heat-resistant nitrogen-containing aromatic polymer is laminated so that the heat shrinkage ratio decreases when the temperature reaches a high temperature range after shutdown. However, the adhesiveness between the porous layer and the porous substrate is not sufficient so that the heat rupture resistance cannot be ensured, and the shutdown characteristic depends on the characteristic of the porous film.

It could therefore be helpful to provide a porous film at low cost, the porous film having excellent battery characteristics and being capable of imparting a shutdown characteristic at low temperature, a large temperature difference between the shutdown temperature and the temperature at which the separator melts, and dimensional stability and heat rupture resistance at high temperature to a secondary battery separator.

SUMMARY

We sought to provide a porous film at low cost, the porous film having excellent battery characteristics and being capable of imparting a shutdown characteristic at low temperature, a large temperature difference between the shutdown temperature and the temperature at which the separator melts, and dimensional stability and heat rupture resistance at high temperature to a secondary battery separator.

We thus provide:

(1) A porous film comprising: a porous substrate; and a porous layer laminated on at least one surface of the porous substrate, the porous layer containing an organic resin different from a resin constituting the porous substrate, wherein in an interface between the porous substrate and the porous layer, a height of a projection of the porous layer is 200 nm or more and a distance between projections is 1 µm or more.

(2) The porous film according to (1), wherein the porous layer has a porosity of 40% to 80%, and an adhesive ratio between the porous substrate and the organic resin constituting the porous layer is 50% to 90%.

(3) The porous film according to (1) or (2), wherein the porous layer contains an inorganic particle.

(4) The porous film according to any one of (1) to (3), wherein a falling ball film rupture temperature is 280° C. or higher.

(5) The porous film according to any one of (1) to (4), wherein a shutdown temperature is 135° C. or lower.

(6) The porous film according to any one of (1) to (5), wherein a difference between a shutdown temperature and a meltdown temperature ("shutdown temperature–meltdown temperature") is 70° C. or higher.

(7) A secondary battery separator comprising the porous film according to any one of (1) to (6).

(8) A secondary battery comprising the secondary battery separator according to (7).

We provide a secondary battery separator having excellent battery characteristics at low cost, which sufficiently exhibits a porous layer characteristic due to excellent adhesiveness between a porous substrate and a porous layer. By using the secondary battery separator, it is possible to provide a secondary battery having a good shutdown characteristic at low temperature, good dimensional stability and heat rupture resistance at high temperature, high capacity, high output, long life, and low cost.

BRIEF DESCRIPTION OF THE DRAWING

The drawing is a conceptual diagram showing a height of a projection and distance between projections of a porous layer.

REFERENCE SIGNS LIST

1 Porous film
2 Porous layer
3 Porous substrate
4 Interface between porous layer and porous substrate
5 Projection
6 Height of a projection
7 Distance between projections

DETAILED DESCRIPTION

Our porous film includes a porous substrate and a porous layer laminated on at least one surface of the porous substrate, the porous layer containing an organic resin different from a resin constituting the porous substrate, and in an interface between the porous substrate and the porous layer, a height of a projection of the porous layer is 200 nm or more and a distance between projections is 1 μm or more.

Our films, separators and batteries are described in detail below.

Porous Layer
Organic Resin

The porous layer contains an organic resin different from a resin constituting the porous substrate. The organic resin different from a resin constituting the porous substrate refers to an organic resin different from a resin constituting the porous substrate. The organic resin is selected depending on the characteristics to be imparted to the porous layer. The resin constituting the porous substrate refers to a resin occupying 50 mass % or more based on 100 mass % of the entire porous substrate.

When characteristics such as a large temperature difference between shutdown temperature and temperature at which the separator melts or dimensional stability and heat rupture resistance at high temperature is intended to be imparted to the porous layer, a heat-resistant resin is preferably used as the organic resin.

The heat-resistant resin means a resin (A) that has a melting point of 200° C. or higher or a resin (B) that has no melting point. The melting point can be measured based on HS K7121 (2012). The resin (A) having the melting point of 200° C. or higher refers to a resin having a peak top of an endothermic peak being 200° C. or higher obtained at the time of a second temperature rise after temperature is raised for the first time and is then lowered. The resin (B) having no melting point refers to a resin having no peak top in a measurement temperature range of −20° C. to 230° C.

Examples of the above resin include polyethylene terephthalate, polysulfone, polyether sulfone, polyphenylene sulfide, polyarylate, polyetherimide, polyetheretherketone, polyamide, polyimide, polyamide imide, fluororesin, cellulose, derivatives thereof and the like. In addition, a plurality of these materials may be mixed or laminated. As the resin, among the above materials, aromatic polyamides, aromatic polyimides, and aromatic polyamide-imides are more preferred, and aromatic polyamides are the most preferred.

Examples of aromatic polyamides include meta-oriented aromatic polyamides and para-oriented aromatic polyamides. Either of meta-oriented aromatic polyamides and para-oriented aromatic polyamides may be used. From the viewpoint of excellent battery characteristics and heat shrinkage ratio when the porous film is used as a secondary battery separator, para-oriented aromatic polyamides are preferred.

Para-oriented aromatic polyamides are obtained by polymerization of para-oriented aromatic diamines and para-oriented aromatic dicarboxylic halides, and meta-oriented aromatic polyamides are obtained by polymerization of meta-oriented aromatic diamines and meta-oriented aromatic dicarboxylic halides.

Aromatic polyamides, which may be used preferably, have repeating units represented by chemical formula (1) and/or chemical formula (2):

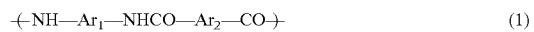 (1)

 (2)

Examples of $Ar_1$, $Ar_2$ and $Ar_3$ include a group selected from groups represented by chemical formulas (3) to (7):

 (3)

 (4)

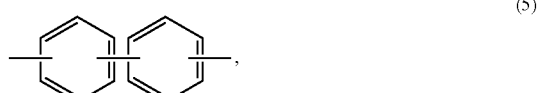 (5)

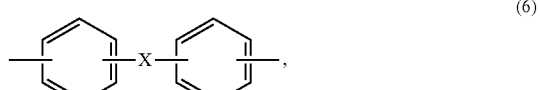 (6)

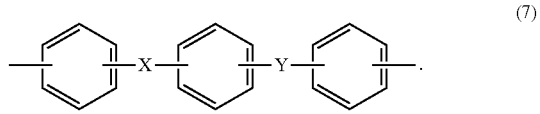 (7)

Each of X and Y is selected from —O—, —CO—, —CO$_2$—, —SO$_2$—, —CH$_2$—, —S—, —C(CH$_3$)$_2$— and the like, and is not limited to these.

Further, a part of hydrogen atoms on an aromatic ring in these $Ar_1$ to $Ar_3$ may be replaced by a substituent such as halogen groups such as fluorine, bromine and chlorine, nitro groups, cyano groups, alkyl groups, and alkoxy groups. Particularly, when $Ar_1$ to $Ar_3$ have an electron-withdrawing substituent such as a halogen group, a nitro group, or a cyano group, the porous film is preferred because it has excellent electrochemical oxidation resistance and prevents deterioration such as oxidation on the positive electrode side when used as a separator. Among the substituent, the halogen groups are more preferred, and the chlorine atoms are the most preferred.

In addition, an atomic bonding in $Ar_1$ to $Ar_3$ may be any of an ortho-orientation, a meta-orientation, and a para-orientation, and it is preferable that aromatic rings having a para-orientation occupy 50 mol % or more based on the total aromatic rings. More preferred molar ratio is 100 mol %. The para-orientation refers to a state where the divalent atomic bonds constituting the main chain in the aromatic ring are coaxial or parallel to each other.

The logarithmic viscosity ($\eta_{inh}$), which is an index of the molecular weight of the organic resin, is preferably 3.0 dl/g or more. When the logarithmic viscosity ($\eta_{inh}$) is 3.0 dl/g or more, the adhesiveness with the porous substrate is improved, and the characteristics of the porous layer can be sufficiently exhibited. From the viewpoint of the adhesiveness with the porous substrate, the logarithmic viscosity is more preferably 3.5 dl/g or more. When a coating liquid contains inorganic particles, the upper limit of the logarithmic viscosity is preferably 7.0 dl/g from the viewpoint of dispersibility of inorganic particles and productivity.

The logarithmic viscosity ($\eta_{inh}$) of the organic resin may be controlled by the kind, molecular weight, and degree of polymerization of the organic resin.

In addition, the logarithmic viscosity ($\eta_{inh}$) of the organic resin can be measured by a measurement method described in items of Examples.

When the organic resin having the characteristics described above is used for the porous layer, heat resistance can be imparted to the porous film, for example.

When the shutdown characteristic at low temperature is intended to be imparted to the porous layer, the following organic resin is preferably used as the organic resin. The shutdown characteristic at low temperature refers to a characteristic that the following shutdown temperature is 135° C. or lower. When a secondary battery has high capacity and a high output, the shutdown temperature is more preferably 130° C. or lower from the viewpoint of further lowering the heat generation starting temperature. In addition, as the organic resin used to impart the shutdown characteristic at low temperature, for example, an organic resin having a melting point of 135° C. or lower is preferably used.

The above organic resin is not particularly limited as long as its melting point is 135° C. or lower, and polyolefin resins, acrylic resins, fluororesins, polyvinylidene fluoride, and the like may be preferably used because the introduction of moisture into the system is remarkably disfavored when the organic resin is used for a lithium ion battery which is a non-aqueous electrolyte secondary battery. Particularly, as the organic resin, particles made of high-density polyethylene, low molecular weight polyethylene, or the like may be preferably used.

Inorganic Particles

When foreign matter resistance is intended to be imparted to the porous layer, the porous layer preferably contains inorganic particles. The foreign matter resistance refers to resistance to fallen matters of active materials from a positive electrode or a negative electrode, or resistance to foreign matters mixed during a production process of a battery.

Specific examples of the inorganic particles include inorganic oxide particles such as aluminum oxide (alumina particles), boehmite, silica, titanium oxide, zirconium oxide, iron oxide, and magnesium oxide, inorganic nitride particles such as aluminum nitride and silicon nitride, poorly soluble ionic crystal particles such as calcium fluoride, barium fluoride, and barium sulfate, and aluminum oxide is preferred. One kind of these particles may be used, or two or more kinds thereof may be mixed and used.

A primary average particle diameter of inorganic particles to be used is preferably 0.10 µm or more and 5.0 µm or less from the viewpoint of adhesiveness between the porous substrate and the porous layer and penetration of the porous layer into the porous substrate. The primary average particle diameter of the inorganic particles is more preferably 0.20 µm or more and 3.0 µm or less, and further preferably 0.30 µm or more and 1.0 µm or less. When the primary average particle diameter of the inorganic particles is 0.10 µm or more, the porous layer does not become too dense, and a sufficient degree of air permeability can be obtained without closing the pores in the porous substrate. In addition, the pore diameter is not too small, the impregnation property of the electrolytic solution is improved, and the productivity is excellent. When the primary average particle diameter of the inorganic particles is 5.0 µm or less, the penetration of the porous layer into the porous substrate is sufficient, and a sufficient heat shrinkage ratio is obtained. In addition, excellent battery characteristics are obtained without increasing the thickness of the porous layer.

Examples of the shape of the particles to be used include a spherical shape, a plate shape, a needle shape, a rod shape, and an oval shape, and any shape may be used. Among them, the spherical shape is preferred from the viewpoint of a surface modification property, dispersibility, and coatability.

Porous Layer

The porous layer refers to a layer having pores inside. Composition or a forming method of the porous layer is not particularly limited, and a porous layer containing aromatic polyamides as a heat-resistant resin is described below as an example.

Aromatic polyamides prepared from diamine and acid dichloride used as raw materials through a common production method such as solution polymerization, and inorganic particles are dispersed in a solvent, thereby preparing a coating liquid. As the solvent allowing them to disperse, an aprotic organic polar solvent such as N-methyl-2-pyrrolidone, N,N-dimethylacetamide, dimethylformamide, and dimethyl sulfoxide may be used. Among them, N-methyl-2-pyrrolidone is particularly preferred from the viewpoint of formation of a porous structure in the later step.

In addition, a poor solvent for an aromatic polyamide may be added to facilitate the porosification. Among them, water is preferably added, and the amount of water to be added is preferably 500 parts by mass or less with respect to 100 parts by mass of aromatic polyamides. When the amount of water added is greater than 500 parts by mass, aromatic polyamides may be solidified in the coating liquid, and the stability of the coating agent may not be sufficiently obtained.

To impart shutdown characteristics at low temperature, organic resins such as fluororesins, acrylic resins, olefin resins, and polyvinyl pyrrolidone may be added to the coating liquid, in addition to the aromatic polyamide and the inorganic particles. Examples of the fluororesins to be added include homopolymers such as polyvinylidene fluoride, polytetrafluoroethylene, polyvinyl fluoride, and polychlorotrifluoroethylene, and copolymers such as an ethylene-tetrafluoroethylene polymer and an ethylene-chlorotrifluoroethylene polymer. In addition, dispersants, thickeners, stabilizers, defoamers, and leveling agents may be added to the coating liquid as necessary.

The order of preparing the coating liquid is not particularly limited, and a preferred order is an order in which a solution obtained by mixing aromatic polyamides with an aprotic organic polar solvent and allowing the aromatic polyamides to dissolve is mixed with a dispersion liquid obtained by dispersing inorganic particles in the aprotic organic polar solvent, and further other organic resins, additives, and the like are added as necessary, thereby preparing the coating liquid, from the viewpoint of uniform dispersion of particles and uniformity of particle diameter of inorganic particles in the coating liquid.

A dispersion method of a coating liquid is not particularly limited, and it is important that the particles are uniformly dispersed and the particle diameter of the inorganic particles in the coating liquid is uniform from the viewpoint of adhesiveness between the porous substrate and the porous layer, and penetration of the porous layer into the porous substrate. It is preferred that the coating liquid is firstly dispersed by using a stirrer such as a homogenizer, an ultrasonic homogenizer, a high pressure homogenizer, an ultrasonic device, and a paint shaker, and then is secondarily dispersed by using a mill such as a ball mill, a bead mill, a sand mill, or a roll mill. Particularly, in the secondary dispersion, dispersion is preferably performed by using a bead mill, and it is preferable that a diameter of a bead used for the bead mill is 0.1 mm to 1 mm, and aluminum oxides, zirconium oxides, zirconia reinforced alumina, or the like are used as a material of the bead, from the viewpoint of uniformity of a particle diameter of inorganic particles in the coating liquid. In addition, dispersion by the bead mill is preferably performed for a plurality of times, and further it is preferable to change the peripheral speed stepwise from the viewpoint of uniformity of a particle diameter of inorganic particles in the coating liquid.

The uniformity of a particle diameter of inorganic particles in the coating liquid can be calculated as follows: "(particle size D90–particle size D10)/particle size D50× 100." The uniformity of a particle diameter of inorganic particles in the coating liquid is preferably 100 or less, and more preferably 70 or less. Particle size D90 of the inorganic particles in the coating liquid is preferably 2.0 µm or less, and more preferably 1.5 µm or less, from the viewpoint of penetration of the porous layer into the porous substrate.

From the viewpoint of adhesiveness between the porous substrate and porous layer and penetration of the porous layer into the porous substrate, the viscosity of the coating liquid is preferably 500 mPa·s to 1,500 mPa·s, and more preferably 600 mPa·s to 1,200 mPa·s. The viscosity of the coating liquid can be controlled by concentration of solid contents of the coating liquid, a mixing ratio of organic resins and inorganic particles, and molecular weight of the organic resin, or the like.

The viscosity of the coating liquid can be measured by a measurement method described in items of Examples.

Next, the obtained coating liquid is applied to the porous substrate, followed by being immersed in a water tank and performing drying, and the porous layer is laminated. As a coating method, coating may be performed by common methods. It is possible to utilize, for example, dip coating, gravure coating, slit die coating, knife coating, comma coating, kiss coating, roll coating, bar coating, spray painting, dip coating, spin coating, screen printing, ink jetting printing, pat printing, other kinds of printing and the like. The coating method is not limited to these, and a coating method may be selected depending on preferred conditions for fluororesins to be used, the organic resin, inorganic particles, binders, dispersants, leveling agents, a solvent to be used, a substrate and the like. To improve coatability, for example, a surface treatment for a surface to be coated such as a corona treatment or a plasma treatment, may be performed on the porous substrate.

The content of inorganic particles in the porous layer is preferably equal to or more than 60 mass % and less than 95 mass %, and more preferably equal to or more than 65 mass % and less than 95 mass %, based on 100 mass % of the entire porous layer. The content of inorganic particles is still more preferably equal to or more than 70 mass % and less than 95 mass %. When the porous film contains a plurality of porous layers, the above feature should be considered for each porous layer.

When the content of inorganic particles in the porous layer is less than 95 mass %, characteristics of the porous layer can be obtained sufficiently. When the content is 60 mass % or more, the content of the organic resin is small, a sufficient porous structure is obtained, resistance is reduced, and battery characteristic are improved. In addition, it is also advantageous in terms of cost. When the porous film contains a plurality of porous layers, regarding each porous layer, the content of inorganic particles in at least one layer is preferably equal to or more than 60 mass % and less than 95 mass %, and the content of inorganic particles in all the porous layers is preferably equal to or more than 60 mass % and less than 95 mass %.

The total thickness of the porous layer is preferably 1 µm or more and 6 µm or less. The total thickness is more preferably 1.5 µm or more and 5 µm or less, and still more preferably 2 µm or more and 4 µm or less. The "total thickness of the porous layer" refers to the thickness of the porous layer when the porous film includes a porous layer on one surface of the porous substrate, and refers to the total thickness of two porous layers when the porous film includes porous layers on both surfaces of the porous substrate. When the total thickness of the porous layer is 1 µm or more, sufficient heat rupture resistance can be obtained. When the total thickness of the porous layer is 6 µm or less, a sufficient porous structure is obtained, and battery characteristics are improved. In addition, it is also advantageous in terms of cost.

The porosity of the porous layer is preferably 40% to 80%. The porosity is more preferably 45% or more and 75% or less, and still more preferably 50% or more and 70% or less. When the porosity of the porous layer is 40% or more, sufficient ion permeability can be obtained and battery characteristics are improved. When the porosity of the porous layer is 80% or less, sufficient heat resistance can be obtained.

The porosity of the porous layer can be obtained by using the following method. Ion coating is performed on a cross section of the porous layer, and image data of the cross section is obtained by a field emission scanning electron microscope (FE-SEM). Image analysis of the obtained image data is performed, and unopened parts are subtracted from the entire image so that an area of the opening portions is calculated and the porosity can be determined.

Porous Substrate

Examples of the porous substrate include a porous membrane having pores inside, a nonwoven fabric, or a porous membrane sheet made of fibrous materials and the like. As a resin constituting the porous substrate, a resin that is electrically insulating, electrically stable, and stable in electrolytic solutions preferably constitutes the porous substrate. In addition, a resin to be used from the viewpoint of imparting shutdown functions is preferably a thermoplastic resin, and a thermoplastic resin having a melting point of 200° C. or lower is preferable. The shutdown functions here refer to a function that when a lithium ion battery generates heat abnormally, the porous structure is closed due to melting by the heat and the movement of ions is stopped, causing power generation to stop.

Examples of the thermoplastic resin include a polyolefin, and the above porous substrate is preferably a porous substrate containing a polyolefin. In addition, the porous substrate containing the above polyolefin is more preferably a porous substrate containing a polyolefin with a melting point of 200° C. or lower. Specific examples of the polyolefin include polyethylene, polypropylene, a copolymer thereof, and a mixture combining these compounds. For example, a single-layer porous substrate containing 90 mass % or more of polyethylene, a multilayer porous substrate composed of polyethylene and polypropylene and the like may be exemplified.

Examples of methods of producing the porous substrate include a porosification method in which a polyolefin-based resin is made into a sheet and then is stretched to become porous, and a porosification method in which a polyolefin-based resin is dissolved in a solvent such as liquid paraffin, and is made into a sheet, followed by extracting the solvent.

The thickness of the porous substrate is preferably 3 μm or more and 50 μm or less, and more preferably 5 μm or more and 30 μm or less. When the thickness of the porous substrate is more than 50 μm, internal resistance of the porous substrate may increase. In addition, when the thickness of the porous substrate is less than 3 μm, production may become difficult and sufficient mechanical characteristics may not be obtained.

The air permeability of the porous substrate is preferably 50 secs/100 cc or more and 1,000 secs/100 cc or less. The above air permeability is more preferably 50 secs/100 cc or more and 500 secs/100 cc or less. When the air permeability is 1,000 secs/100 cc or less, sufficient ion mobility can be obtained and battery characteristics are improved. When the air permeability is 50 secs/100 cc or more, sufficient mechanical characteristics can be obtained.

The average surface roughness of a porous substrate is preferably 20 nm or more and 100 nm or less, more preferably 20 nm or more and 80 nm or less, and still more preferably 25 nm to 50 nm, from the viewpoint of adhesiveness between the porous substrate and porous layer and penetration of the porous layer into the porous substrate. When the average surface roughness is 20 nm or more, the adhesiveness with the porous layer is improved, surface pores of the porous substrate are less likely to be clogged with the porous layer, and battery characteristics can be prevented from deteriorating. When the average surface roughness is 100 nm or less, the adhesiveness with the porous layer is improved and characteristics of the porous layer can be sufficiently exhibited.

Porous Film

The porous film is one in which in an interface between the porous substrate and the porous layer, a height of a projection of the porous layer is 200 nm or more and a distance between projections is 1 μm or more.

The height of a projection of the porous layer in an interface between the porous substrate and the porous layer refers to a height of a projection measured by the measurement method described in items of Examples, and is, for example, represented by reference numeral 6 in FIG. 1.

The projection of the porous layer in the interface between the porous substrate and the porous layer refers to a part in which inorganic particles and organic resin of the porous layer in the interface between the porous layer and the porous substrate is penetrated into the porous substrate and is, for example, represented by reference numeral 5 in FIG. 1.

The distance between projections refers to a distance between projections measured by the measurement method described in items of Examples similarly and is, for example, represented by reference numeral 7 in FIG. 1.

When the height of a projection is less than 200 nm, the adhesiveness between the porous layer and the porous substrate may decrease, and characteristics of the porous layer may not be exhibited sufficiently when the porous film 1 is used for the secondary battery separator to produce a secondary battery. When the distance between projections is less than 1 μm, pores in a surface of the porous substrate may be closed and, thus, battery characteristics may deteriorate. From the viewpoint of adhesiveness between the porous layer and the porous substrate, the height of a projection is preferably 250 nm or more, and more preferably 300 nm to 2,000 nm. When the distance between projections increases, the adhesiveness between the porous layer and the porous substrate is decreased. Accordingly, the distance between projections is preferably 1 μm to 5 μm, and more preferably 2 μm to 4 μm from the viewpoint of battery characteristics.

An adhesive ratio between the porous substrate and the organic resin constituting the porous layer is preferably 50% to 90%. The adhesive ratio is more preferably 50% or more and 85% or less, and still more preferably 60% or more and 85% or less. When the adhesive ratio between the porous substrate and the organic resin constituting the porous layer is 50% or more, the characteristics of the porous layer can be exhibited sufficiently. In addition, when the adhesive ratio is 90% or less, the pores in the surface of the porous substrate is less likely to be clogged, and battery characteristics can be prevented from deteriorating.

The adhesive ratio between the porous substrate and the organic resin constituting porous layer can be obtained by using the following method. Ion coating is performed on a cross section of the porous layer, and image data of the cross section is obtained by a field emission scanning electron microscope (FE-SEM). Image analysis of the obtained image date is performed, the adhesive ratio between the porous substrate and the organic resin constituting the porous layer can be obtained.

The falling ball film rupture temperature of the porous film is preferably 280° C. The falling ball film rupture temperature means a temperature at which a short circuit occurs under a constant load, and is an index for evaluating heat resistance. When the falling ball film rupture temperature is 280° C. or higher, the battery can be prevented from short-circuiting and further generating heat when the battery abnormally generates heat. From the viewpoint of imparting heat resistance to the secondary battery, the falling ball film rupture temperature is preferably 300° C. or higher, and more preferably 350° C. or higher.

The shutdown temperature of the porous film is preferably 135° C. or lower. When the shutdown temperature is 135° C. or lower, the heat generation starting temperature decreases when the secondary battery has high capacity and a high output. Thus, the shutdown function works well. When the secondary battery has high capacity and a high output, the shutdown temperature is more preferably 130° C. or lower from the viewpoint of further lowering the heat generation starting temperature.

A difference between the shutdown temperature and the meltdown temperature "(shutdown temperature−meltdown temperature)" of the porous film (hereinafter, may also be referred to as a difference between the shutdown temperature and the meltdown temperature of the porous film) is preferably 70° C. or higher. The above temperature difference can be achieved by either lowering the shutdown temperature or raising the meltdown temperature. When the difference between the shutdown temperature and the meltdown temperature is 70° C. or higher, the porous film is melted by heat generation. Thus, a temperature difference until complete melting after the porous structure is closed becomes large, short circuit of the battery is prevented, and heat generation can be prevented. From the viewpoint of prevention of short circuit, a difference between the shutdown temperature and the meltdown temperature is more preferably 100° C. or higher.

The shutdown temperature refers to a temperature at which when a lithium ion battery generates heat abnormally, the porous structure is closed due to melting by the heat and the movement of ions is stopped, causing power generation to stop, and the meltdown temperature refers to a temperature at which when heat generation occurs and the temperature is equal to or higher than the shutdown temperature, the porous film is melted and short-circuit of the battery occurs. The shutdown temperature and the meltdown temperature can be evaluated by measuring air permeability while raising the temperature according to the method described in items of Examples, and evaluating the change of the air permeability.

The air permeability of the porous film is preferably 50 secs/100 cc or more and 1,000 secs/100 cc or less. The air permeability is more preferably 50 secs/100 cc or more and 500 secs/100 cc or less. When the air permeability is 1,000 secs/100 cc or less, sufficient ion mobility can be obtained and battery characteristics are prevented from deteriorating. When the air permeability is 50 secs/100 cc or more, sufficient mechanical characteristics can be obtained.

Secondary Battery

The porous film can be preferably used for a separator for a secondary battery such as a lithium ion battery. The lithium ion battery has a structure in which a secondary battery separator and electrolytes are interposed between a positive electrode in which a positive electrode active material is laminated on a positive electrode current collector, and a negative electrode in which a negative electrode active material is laminated on a negative electrode current collector.

The positive electrode is an electrode in which a positive electrode material composed of active materials, binder resins, and conductive assistants is laminated on a current collector, and examples of the active materials include layered lithium-containing transition metal oxides such as $LiCoO_2$, $LiNiO_2$, and $Li(NiCoMn)O_2$, spinel-type manganese oxides such as $LiMn_2O_4$, iron-based compounds such as $LiFePO_4$ and the like. As the binder resin, a resin having high oxidation resistance may be used. Specific examples thereof include fluororesins, acrylic resins, styrene-butadiene resins and the like. As the conductive assistant, a carbon material such as carbon black and graphite may be used. As the current collector, for example, a metal foil is preferred, and aluminum is particularly preferably used.

The negative electrode is an electrode in which a negative electrode material composed of active materials and binder resins is laminated on a current collector, and examples of the active materials include carbon materials such as artificial graphite, natural graphite, hard carbon, and soft carbon, lithium alloy materials with tin, silicon or the like, metal materials such as Li, lithium titanate ($Li_4Ti_5O_{12}$) and the like. As the binder resin, fluororesins, acrylic resins, styrene-butadiene resins, and the like may be used. As the current collector, for example, a metal foil is preferred, and a copper foil is particularly preferably used.

The electrolytic solution provides a field for moving ions between a positive electrode and a negative electrode in a secondary battery, and is obtained by dissolving the electrolyte in an organic solvent. Examples of the electrolyte include $LiPF_6$, $LiBF_4$, $LiClO_4$ and the like, and $LiPF_6$ may be preferably used from the viewpoint of solubility in organic solvents and ionic conductivity. Examples of the organic solvent include ethylene carbonate, propylene carbonate, fluoroethylene carbonate, dimethyl carbonate, diethyl carbonate, ethyl methyl carbonate, gamma-butyrolactone, sulfolane and the like, and two kinds of these organic solvents may be mixed and used.

In a method of producing the secondary battery, for example, first, the active materials and conductive assistants are dispersed in a binder solution to prepare a coating liquid for an electrode, the coating liquid is applied to a current collector, and the solvent is dried, thereby obtaining each of a positive electrode and a negative electrode. The thickness of the coating film after drying is preferably 50 μm or more and 500 μm or less. A secondary battery separator is disposed between the obtained positive electrode and negative electrode to contact an active material layer of each electrode, and they are sealed in an exterior material such as an aluminum laminate film, followed by injection of an electrolytic solution, and then a negative electrode lead or a safety valve are installed and the exterior material is sealed. The secondary battery obtained in this way has high heat rupture resistance and excellent battery characteristics and, further, production at low cost is enabled.

EXAMPLES

Hereinafter, our films, separators and batteries are described in detail with reference to Examples, but this disclosure is not limited thereto. The measurement method used in the example is shown below.

Measurement Method (1) Height of Projection and Distance Between Projections

The porous film was subjected to a cross section polisher (SM-9010, manufactured by JEOL Ltd.) to prepare a cross section in a plane including the width direction and the thickness direction of a sample subjected to a cryo treatment, and then a platinum coat was applied to a surface for observation to prepare a sample for observation. Next, cross sections of the film were observed at a magnification of 20,000 times using a field emission scanning electron microscope (S-4800) manufactured by Hitachi, ltd. The acceleration voltage at the time of observation was set as 1.0 kV. Observation was performed at 10 places. The obtained image data (image of only the observation part without a display such as a scale bar) was subjected to image analysis by using Image-ProPlus Ver. 4.5 manufactured by Planetron Corporation, and the height of a projection and distance between projections were determined. In an image analysis method, first, a flattening filter (dark, 10 pixels) was executed once to fix brightness spots, and then a median filter (kernel size of 3×3) was executed once to remove noise. Next, a local equalization filter (logarithmic distribution, small window 100, step 1) was executed once to highlight bright areas other than the pores. Further, contrast adjustment (contrast 100) was performed, and an interface (reference numeral 4 in FIG. 1) between the porous layer (reference numeral 2 in FIG. 1) and the porous substrate (reference numeral 3 in FIG. 1) was clarified.

For the height 6 of a projection, a part in which the porous layer 2 in the interface 4 between the porous layer and the porous substrate penetrates into the porous substrate 6 was regarded as a projection (e.g., reference numeral 5 in FIG. 1). A difference (reference numeral 6 in FIG. 1) between (i) a vertex of a part (projection 5) at which the porous substrate 3 was most penetrated in the thickness direction of the porous film 1 and (ii) a vertex in a part at which the porous layer 2 was most penetrated in the thickness direction of the porous film 1 within an interface having a width of 5 μm around (i) was defined as a height of a projection for each projection 5. The height of each projection was measured at 10 locations at which the observation was performed, and an average value thereof was determined as a height of a projection. The distance between projections was defined as distance (reference numeral 7 in FIG. 1) between projections, which was obtained by connecting the vertex of the above projection defined as described above with vertexes of two projections adjacent to the projection to obtain two line segments, and setting length of the short one as the distance between the projection and the projection adjacent thereto. The distance between projections was measured at 10 locations at which the observation was performed, and an average value thereof was determined as a distance between projections.

(2) Falling Ball Film Rupture Temperature

A sample with a size of 50 mm×50 mm was cut and used as a sample. The cut sample was fixed to a metal frame in which a hole of a diameter of 12 mm was opened in the middle. A tungsten ball having a diameter of 10 mm was placed in a hole having a diameter of 12 mm, and they were placed in a hot air oven. The temperature was raised at 5° C./min, and the temperature at which the tungsten ball fell was determined as the falling ball film rupture temperature. The measurement was performed five times for each sample, and an average value thereof was obtained.

(3) Thickness of Porous Layer

A cross section of the sample was cut by a microtome, and then was observed by a field emission scanning electron microscope. In the observation region, the highest point from the interface with the porous substrate (that is, a vertex of a part at which the porous layer was most penetrated in the cross section image) was selected, and distance from a bottom surface of the porous layer to the highest point was measured as the thickness of the porous layer. Any five locations from a sample with a size of 100 mm×100 mm were observed respectively, selected, and measured in terms of thickness, and then the obtained values of thickness were averaged.

(4) Shutdown Temperature and Meltdown Temperature

The shutdown temperature and meltdown temperature were measured by a method disclosed in WO 2007/052663 A1. According to this method, the porous film was exposed to an atmosphere at a temperature of 30° C., and the temperature raised at 5° C./min, during which the air permeability of the film was measured. The temperature when the air permeability of porous film (Oken) exceeds 100,000 secs/100 cm$^3$ for the first time was defined as shutdown temperature of the porous film. In addition, regarding the meltdown temperature, the temperature when the air permeability was 100,000 secs/100 cm$^3$ or more, and then the air permeability lowered to 10 secs/100 cm$^3$ or less for the first time was defined as meltdown temperature of the porous film. The upper limit of measurement of the meltdown temperature is 250° C. Air permeability resistance of the porous film was measured in accordance with JIS P 8117 (2009) by using an Oken air permeability resistance meter (EGO-1T manufactured by Asahi Seiko Co., ltd.).

(5) Air Permeability

The air permeability was measured in accordance with JIS P 8117 (1998) by using an Oken air permeability resistance meter (EGO-1T manufactured by Asahi Seiko Co., ltd.).

(6) Porosity

The porous film was subjected to a cross section polisher (SM-9010, manufactured by JEOL Ltd.) to prepare a cross section in a plane including the width direction and the thickness direction of a sample subjected to a cryo treatment, and then a platinum coat was applied to a surface for observation to prepare a sample for observation. Next, cross sections of the film were observed at a magnification of 20,000 times using a field emission scanning electron microscope (S-4800) manufactured by Hitachi, ltd. The acceleration voltage at the time of observation was 1.0 kV.

An image was cut out from the obtained image data (image of only the observation part without a display such as a scale bar) to only remain the porous layer, image analysis was performed using HALCON Ver. 10.0 manufactured by MVTec, and porosity (%) was determined. In the image analysis method, an 11-pixel average image A and a 3-pixel average image B were generated for a 256-tone monochrome image first, and an area (Area_all) of the entire image B was determined. Next, the image A was removed from the image B as difference to generate image C, and a region D satisfying "luminance ≥10" was extracted therefrom. The extracted region D was divided into blocks, and a region E satisfying "area ≥100" was extracted. A region F subjected to a closing treatment with a circular element having a radius of 2.5 pixels was generated for the region E, and a region G subjected to opening treatment with a rectangular element of 1 (horizontal)×5 (vertical) pixels was generated so that pixels with "vertical size <5" was removed. The extracted region G was divided into blocks, and a region H satisfying "area ≥500" was extracted therefrom so that a fibril region was extracted. Further, a region I satisfying "image ≥5" was extracted from the image C, the region I divided into blocks, and a region J satisfying "area ≥300" was extracted therefrom. The region J was subjected to an opening treatment with a circular element having a radius of 1.5 pixels and then subjected to a closing treatment with a circular element with a radius of 8.5 pixels, thereby generating a region K. From the region K, a region L satisfying "area ≥200" was extracted. A region M which was obtained by filling dark areas having "area ≥4,000 pixels" with bright areas was generated in the region L, thereby extracting a region of unopened parts other than fibrils. Finally, a total region N of the region H and the region M was generated, and an area of the total region N (Area_closed) was determined, thereby determining the area of the unopened parts. The calculation of the porosity was performed based on the following equation:

$$\text{Porosity (\%)}=(\text{Area\_all}-\text{Area\_closed})/\text{Area\_all}\times 100.$$

10 places on both surfaces of the same porous film were measured according to the above method, and an average value thereof was defined as porosity of the sample.

(7) Adhesive Ratio Between Porous Substrate and Organic Resin Constituting Porous Layer The porous film was subjected to a cross section polisher (SM-9010, manufactured by JEOL Ltd.) to prepare a cross section in a plane including the width direction and the thickness direction of a sample subjected to a cryo treatment, and then a platinum coat was applied to a surface for observation to prepare a sample for observation. Next, cross sections of the film were observed at a magnification of 20,000 times using a field emission scanning electron microscope (S-4800) manufactured by Hitachi, ltd. The acceleration voltage at the time of observation was 1.0 kV. The obtained image data (image of only the observation part without a display such as a scale bar) was subjected to image analysis by using Image-ProPlus Ver. 4.5 manufactured by Planetron Corporation, and the adhesive ratio between the porous substrate and the organic resin constituting the porous layer was determined. In an image analysis method, first, a flattening filter (dark, 10 pixels) was executed once to fix brightness spots, and then a median filter (kernel size 3×3) was executed once to remove noise. Next, a local equalization filter (logarithmic distribution, small window 100, step 1) was executed once to highlight bright areas other than the pores. Further, contrast adjustment (contrast 100) was performed, and an interface (reference numeral 4 in FIG. 1) between the porous layer (reference numeral 2 in FIG. 1) and the porous substrate (reference numeral 3 in FIG. 1) was clarified.

A ratio of an organic resin part constituting the porous layer in an interface part/interface was defined as the adhesive ratio. 10 places on both surfaces of the same porous film was measured according to the above method, and an average value thereof defined as the adhesive ratio between the porous substrate and the organic resin constituting the porous layer of the sample.

(8) Production of Battery

An aluminum foil was coated with a positive electrode slurry, which was obtained by dispersing 92 parts by mass of Li(Ni$_{5/10}$Mn$_{2/10}$Co$_{3/10}$)O$_2$ as a positive electrode active material, 2.5 parts by mass of acetylene black and graphite as the positive electrode conductive assistant, and 3 parts by mass of polyvinylidene fluoride as a positive electrode binder into N-methyl-2-pyrrolidone by using a planetary mixer, followed by performing drying and rolling, thereby producing a positive electrode sheet (coating basis weight: 9.5 mg/cm$^2$).

This positive electrode sheet was cut out to be 40 mm×40 mm. At this time, a current-collecting tab-attached portion having no active material layer was cut out to have a size of 5 mm×5 mm outside an active material surface. An aluminum tab having a width of 5 mm and a thickness of 0.1 mm was ultrasonically welded to the tab-attached portion.

A copper foil was coated with a negative electrode slurry, which was obtained by dispersing 98 parts by mass of natural graphite as a negative electrode active material, 1 part by mass of carboxymethylcellulose as a thickener, 1 part by mass of styrene-butadiene copolymer as a negative electrode binder into water by using a planetary mixer, followed by performing drying and rolling, thereby producing a negative electrode sheet (coating basis weight: 5.5 mg/cm$^2$).

This negative electrode sheet was cut out to be 45 mm×45 mm. At this time, a current-collecting tab-attached portion having no active material layer was cut out to have a size of 5 mm×5 mm outside an active material surface. A copper tab having the same size as the positive electrode tab was ultrasonically welded to the tab-attached portion.

Next, the porous film was cut out to be 55 mm×55 mm, the positive electrode and the negative electrode were stacked on both surfaces of the porous film so that the porous film was interposed between active material layers, and all the positive electrode coating portion was disposed to face the negative electrode coating portion to obtain an electrode group. The above positive electrode, negative electrode and porous film were interposed between one sheet of aluminum laminated film of 90 mm×200 mm, long sides of the aluminum laminated film were folded, and the two long sides of the aluminum laminated film were heat-sealed to form a bag.

An electrolytic solution, which was prepared by dissolving LiPF$_6$, as a solute, in a mixed solvent containing ethylene carbonate and diethyl carbonate (ethylene carbonate:diethyl=1:1 (volume ratio)) to reach a concentration of 1 mol/liter, was used. 1.5 g of electrolytic solutions were injected into the bag-shaped aluminum laminated film, and the short side portion of the aluminum laminated film was thermally fused while impregnating under reduced pressure to obtain a laminate type battery.

(9) Discharge Rate Characteristics

Tests were performed on the discharge rate characteristics of the produced laminate type battery according to the following procedure, and the discharge rate characteristics were evaluated based on a discharge capacity retention ratio.

A constant current charge with a charge condition of 0.5 C, and 4.25 V, and a constant current discharge with a discharge condition of 0.5 C and 7 C, and 2.7 V were performed separately.

Calculation of Discharge Capacity Retention Ratio

The discharge capacity retention ratio was calculated as follows "(discharge capacity at 7 C)/(discharge capacity at 0.5 C)×100." Five laminated type batteries were produced, and an average value thereof was defined as the discharge capacity retention ratio. Judgment was performed as follows: A: 80% or more, B: 75% or more and less than 80%, and C: less than 75%.

(10) Logarithmic Viscosity ($\eta_{inh}$)

An organic resin was dissolved at a concentration of 0.5 g/dl in N-methyl-2-pyrrolidone (NMP) containing 2.5 mass % of lithium bromide (LiBr), and flow time thereof was measured at 30° C. by using an ubbelohde viscometer. The flow time of a blank solution that does not dissolve the organic resin was measured in the same manner, and the logarithmic viscosity ($\eta_{inh}$) was calculated by the following equation:

$$\eta_{inh}(dl/g)=[\ln(t/t_0)]/0.5$$

t: Flow time of organic resin solution (sec)
$t_0$: Flow time of blank solution (sec).

(11) Viscosity (mPa·s)

The viscosity (mPa·s) of the secondary dispersion liquid was measured using a RB80U viscometer (manufactured by Toki Sangyo Co., Ltd.) with an HH1 rotor (rotor code No. 25) at 30° C. and 100 rpm.

Example 1

2-chloro-1,4-phenylenediamine equivalent to 75 mol % based on the total amount of diamine and 4,4'-diaminodiphenyl ether equivalent to 25 mol % were dissolved in dehydrated N-methyl-2-pyrrolidone. 2-chloroterephthaloyl chloride equivalent to 99 mol % to the total amount of diamine was added to the above obtained solution as acid dichloride, followed by stirring, thereby polymerizing the aromatic polyamides. The obtained polymerization solution was neutralized with lithium carbonate in an amount of 97 mol % based on the total amount of the acid dichloride, and further was neutralized with 15 mol % of diethanolamine and 25 mol % of triethanolamine, and thus an aromatic polyamide solution having a concentration of the aromatic polyamide being 10 mass % was obtained. The obtained aromatic polyamide does not have a peak top and a melting point in a measurement temperature range of −20° C. to 230° C. so that the obtained aromatic polyamide was the heat-resistant resin. In addition, the logarithmic viscosity $\eta_{inh}$ of the obtained aromatic polyamide was 4.5 dl/g.

N-methyl-2-pyrrolidone was added to the obtained aromatic polyamide solution, and the mixture was primarily dispersed with a stirrer. N-methyl-2-pyrrolidone was added to alumina particles (high-purity alumina manufactured by Sumitomo Chemical Co., Ltd., average particle diameter: 0.4 µm), and the mixture was primarily dispersed with a stirrer. The primarily dispersed dispersion liquids were combined and mixed such that, based on 100 parts by mass of a total of aromatic polyamide and alumina particles, the amount of the aromatic polyamide was 10 parts by mass and the amount of the alumina particles was 90 parts by mass, and N-methyl-2-pyrrolidone was additionally added such that the solid content concentration was 18 mass %. The mixed solution was further primarily dispersed by a stirrer. The prepared primary dispersion liquid was dispersed using a bead mill. Zirconia reinforced alumina having a diameter of 0.5 mm was used as the bead, the primary dispersion liquid dispersed twice at a peripheral speed of 6 m/s, and then was dispersed twice at a peripheral speed of 10 m/s to obtain a secondary dispersion liquid. The viscosity of the obtained secondary dispersion liquid was 800 mPa·s.

The obtained secondary dispersion liquid was applied to both surfaces of a polyethylene porous substrate (SETELA manufactured by Toray Industries, ltd., thickness: 5 µm, air permeability: 120 secs/100 cc, average surface roughness: 30 nm) by dip coating, followed by being immersed in a water tank and drying until the solvent contained therein was volatilized, thereby forming a porous layer, and thus the porous film was obtained. Measurement results of the characteristics of the obtained porous film were shown in Table 1.

Example 2

A porous film was obtained in the same manner as Example 1 except that the polyethylene porous substrate was changed to SETELA manufactured by Toray Industries, Ltd. with a thickness of 5 µm, air permeability of 120 secs/100 cc, and an average surface roughness of 50 nm.

Example 3

A porous film was obtained in the same manner as Example 1 except that 2-chloroterephthaloyl chloride equivalent to 99.7 mol % based on the total amount of diamine was added, the logarithmic viscosity $\eta_{inh}$ of the aromatic polyamide was 5.5 dl/g, and the viscosity of the secondary dispersion liquid was 1,000 mPa·s.

Example 4

N-methyl-2-pyrrolidone was added to the aromatic polyamide solution obtained in Example 1, the mixture was primarily dispersed with a stirrer. N-methyl-2-pyrrolidone was added to polyethylene resin particles (melting point: 120° C., average particle diameter: 0.5 µm) and alumina particles (high-purity alumina, manufactured by Sumitomo Chemical Co., Ltd., average particle diameter: 0.4 µm), and the mixture was primarily dispersed with a stirrer. A porous film was obtained in the same manner as Example 1 except that the primarily dispersed dispersion liquids were combined and mixed such that, based on 100 parts by mass of a total of aromatic polyamide, polyethylene resin particles, and alumina particles, the amount of the aromatic polyamide was 10 parts by mass and the amount of the polyethylene resin particles was 10 parts by mass, and the amount of the alumina particles was 80 parts by mass, and N-methyl-2-pyrrolidone was additionally added such that the solid content concentration was 20 mass %.

Comparative Example 1

A porous film was obtained in the same manner as Example 1 except that 2-chloroterephthaloyl chloride equivalent to 98 mol % based on the total amount of diamine was added, the logarithmic viscosity of the aromatic polyamide was 2.5 dl/g, the viscosity of the secondary dispersion liquid was 500 mPa·s, and the polyethylene porous substrate was changed to SETELA manufactured by Toray Industries, Ltd. with a thickness of 5 µm, air permeability of 120 secs/100 cc, and an average surface roughness of 10 nm.

Comparative Example 2

A porous film was obtained in the same manner as Example 1 except that the polyethylene porous substrate was changed to SETELA manufactured by Toray Industries, Ltd. with a thickness of 5 µm, air permeability of 120 secs/100 cc, and an average surface roughness of 10 nm.

Comparative Example 3

A porous film was obtained in the same manner as Example 1 except that mixing was performed such that, based on 100 parts by mass of a total of aromatic polyamide and alumina particles, the amount of aromatic polyamide was 45 parts by mass, and the amount of the alumina particles was 55 parts by mass, and N-methyl-2-pyrrolidone was additionally added such that the solid content concentration was 8 mass %.

TABLE 1

| | Height of projection (nm) | Distance between projections (µm) | Adhesive ratio between porous substrate and organic resin (%) | Porosity of porous layer (%) | Thickness of porous layer (µm) | Air Permeability (sec) | Falling ball film rupture temperature (° C.) | Shutdown temperature (° C.) | Meltdown temperature (° C.) | Battery characteristic |
|---|---|---|---|---|---|---|---|---|---|---|
| Example 1 | 300 | 1.3 | 70 | 65 | 4 | 150 | 390 | 138 | 250 or higher | A |
| Example 2 | 330 | 1.8 | 60 | 64 | 4 | 170 | 380 | 140 | 250 or higher | A |
| Example 3 | 380 | 1.4 | 80 | 60 | 4 | 250 | 395 | 139 | 250 or higher | B |
| Example 4 | 250 | 1.2 | 65 | 55 | 4 | 230 | 330 | 125 | 250 or higher | B |
| Comparative Example 1 | 100 | 1.3 | 45 | 62 | 4 | 160 | 200 | 140 | 195 | A |

TABLE 1-continued

|  | Height of projection (nm) | Distance between projections (μm) | Adhesive ratio between porous substrate and organic resin (%) | Porosity of porous layer (%) | Thickness of porous layer (μm) | Air Permeability (sec) | Falling ball film rapture temperature (° C.) | Shutdown temperature (° C.) | Meltdown temperature (° C.) | Battery characteristic |
|---|---|---|---|---|---|---|---|---|---|---|
| Comparative Example 2 | 280 | 0.5 | 77 | 60 | 4 | 180 | 385 | 140 | 250 or higher | C |
| Comparative Example 3 | 250 | 0.3 | 87 | 35 | 4 | 350 | 380 | 142 | 250 or higher | C |

It can be seen from Table 1 that all of the Examples sufficiently exhibited the characteristics of the porous layer and good battery characteristics were obtained.

In contrast, a height of a projection was low or the distance between projections was short in the Comparative Examples, and thus the characteristics of the porous layer were not exhibited or the battery characteristics were insufficient.

INDUSTRIAL APPLICABILITY

We provide a secondary battery separator having excellent battery characteristics at low cost, which can sufficiently exhibit characteristics of a porous layer due to the excellent adhesiveness between the porous substrate and the porous layer.

Although this disclosure is described in detail with reference to the specific examples, it will be apparent to those skilled in the art that various changes and modifications can be made without departing from the spirit and scope of this disclosure and the appended claims.

This application is based on Japanese Patent Application No. 2017-189896 filed on Sep. 29, 2017, the content of which are incorporated herein by reference.

The invention claimed is:

1. A porous film comprising:
    a porous substrate; and
    a porous layer laminated on at least one surface of the porous substrate, the porous layer containing an organic resin different from a resin constituting the porous substrate,
    wherein in an interface between the porous substrate and the porous layer, a height of a projection of the porous layer is 200 nm or more and a distance between projections is 1 μm to 5 μm, and
    the porous layer has a porosity of 40% to 80%, and an adhesive ratio between the porous substrate and the organic resin constituting the porous layer is 50% to 85%.

2. The porous film according to claim 1, wherein the porous layer contains an inorganic particle.

3. The porous film according to claim 1, having a falling ball film rupture temperature of 280° C. or higher.

4. The porous film according to claim 1, having a shutdown temperature of 135° C. or lower.

5. The porous film according to claim 1, wherein a difference between a shutdown temperature and a meltdown temperature (shutdown temperature−meltdown temperature) is 70° C. or higher.

6. The porous film according to claim 1, wherein the organic resin has a logarithmic viscosity ($\eta_{inh}$) of 3.0 dl/g or more and 7.0 dl/g or less.

7. A secondary battery separator comprising the porous film according to claim 1.

8. A secondary battery comprising the secondary battery separator according to claim 6.

* * * * *